United States Patent Office 3,170,266
Patented Feb. 23, 1965

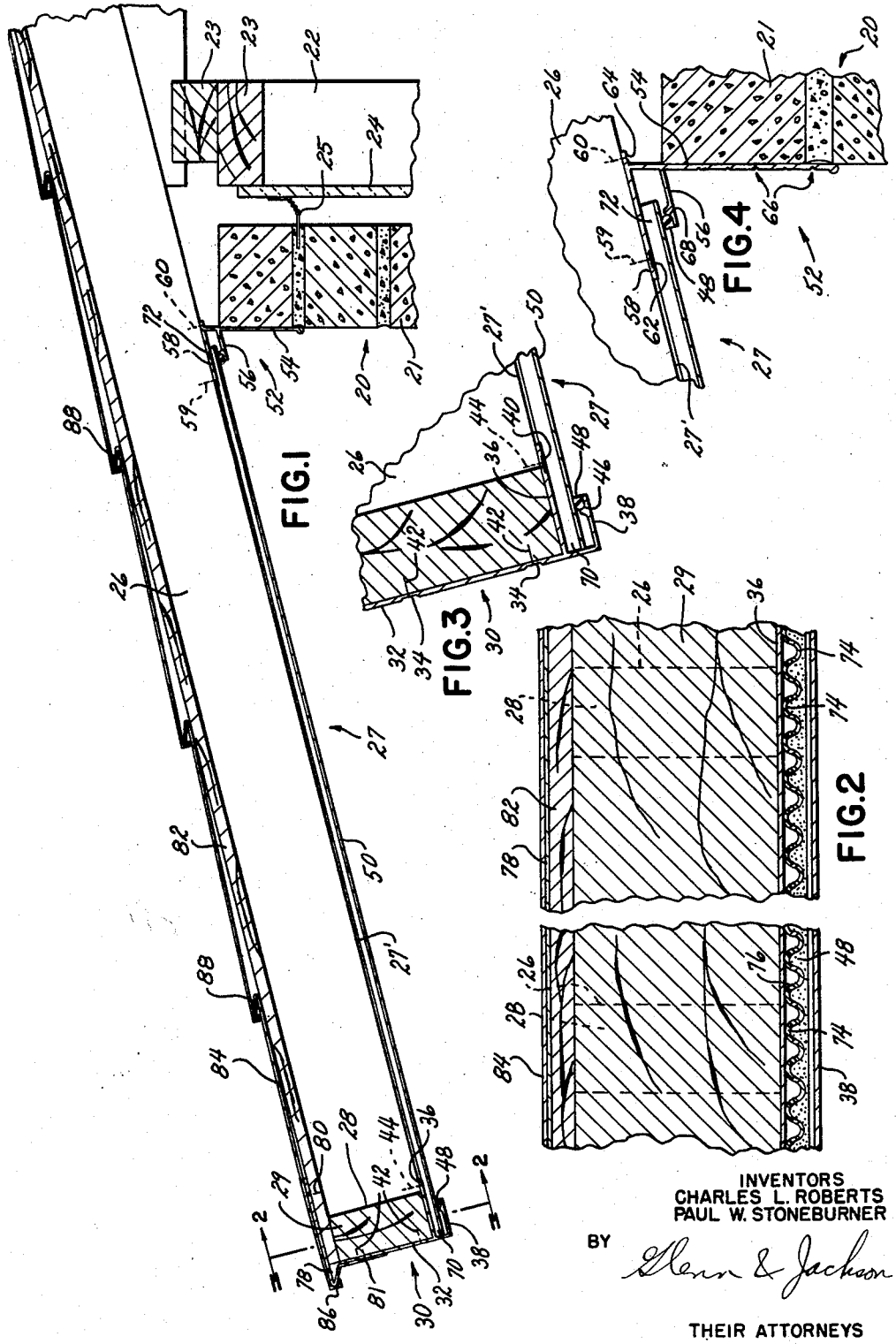

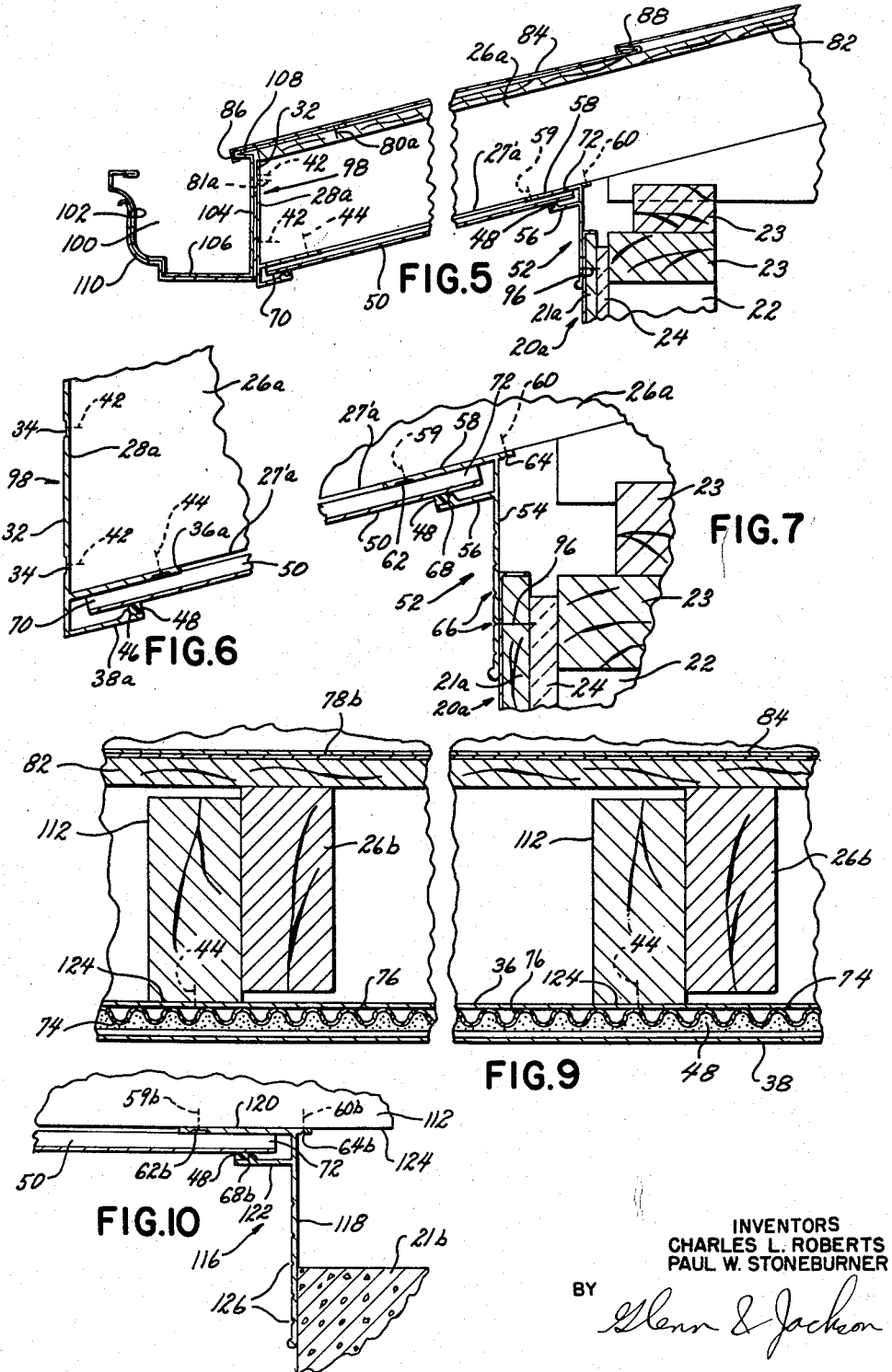

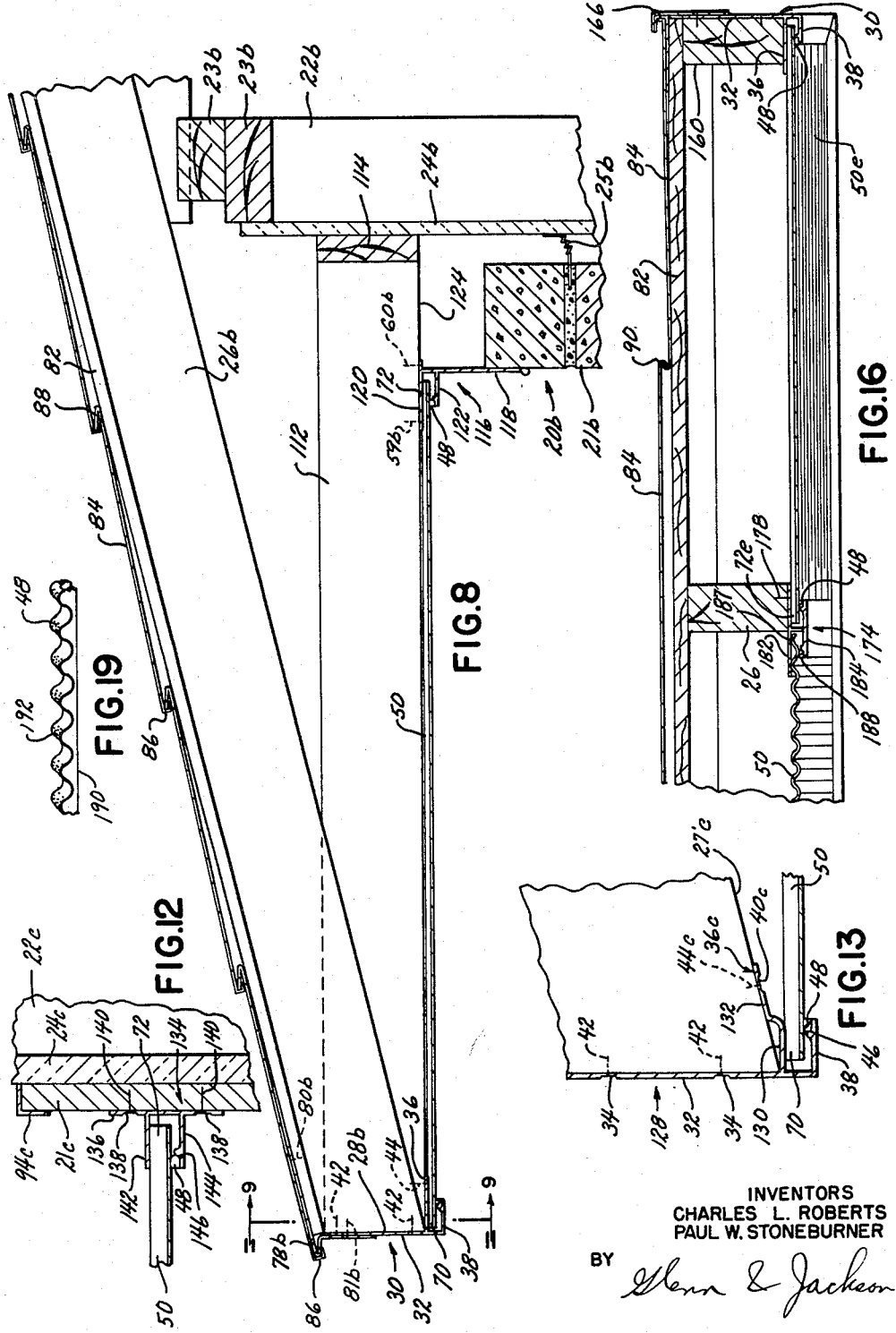

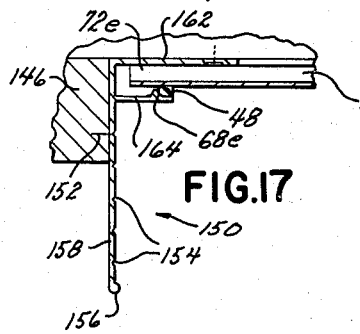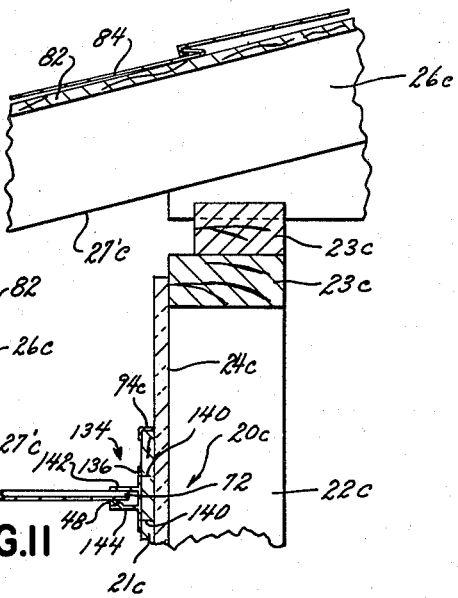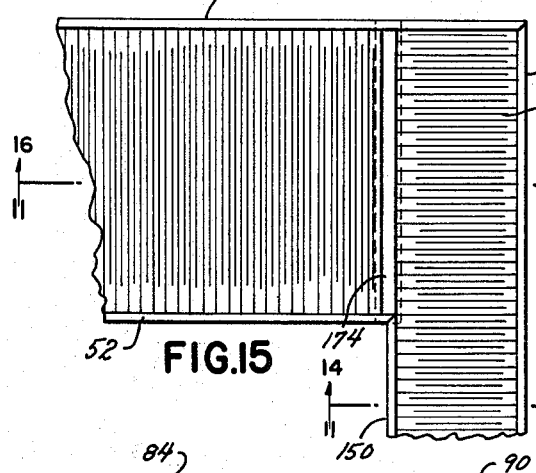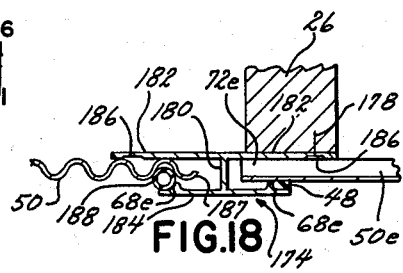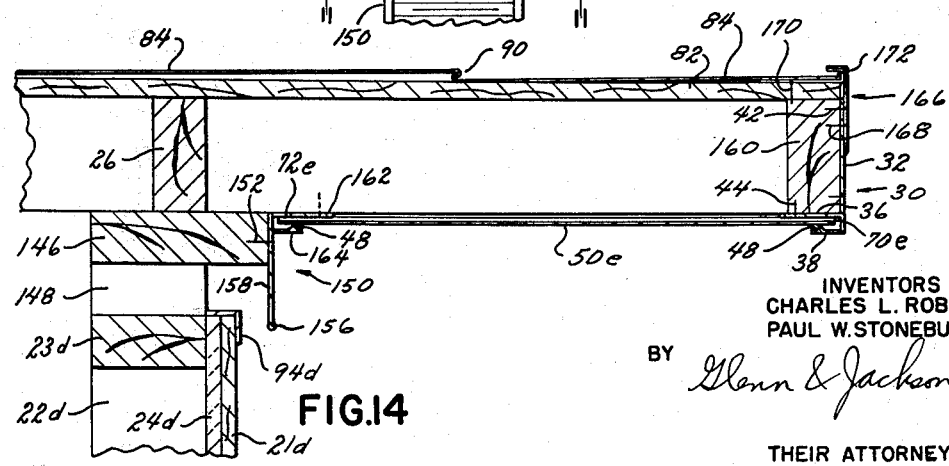

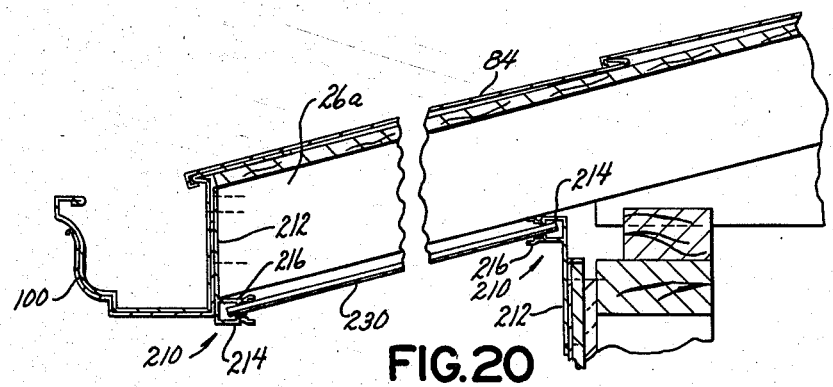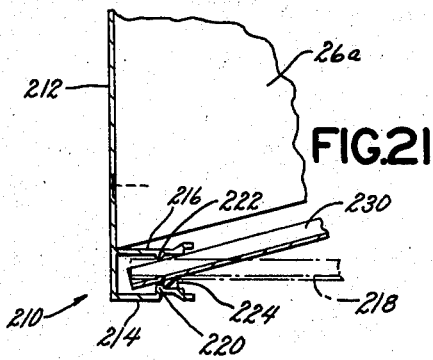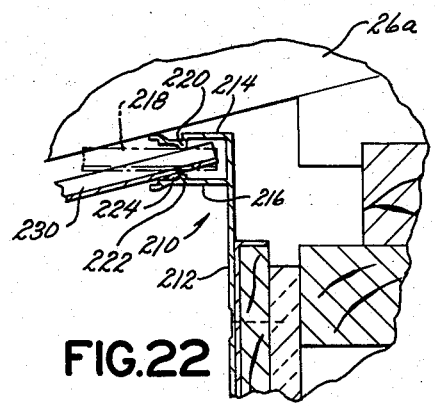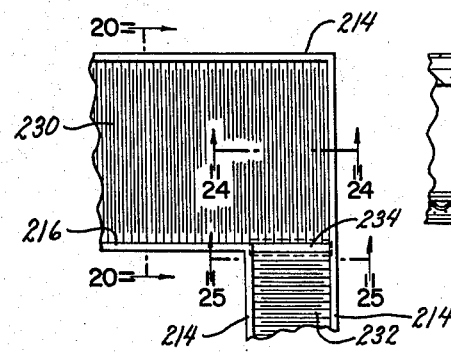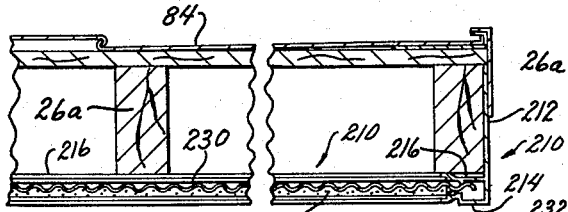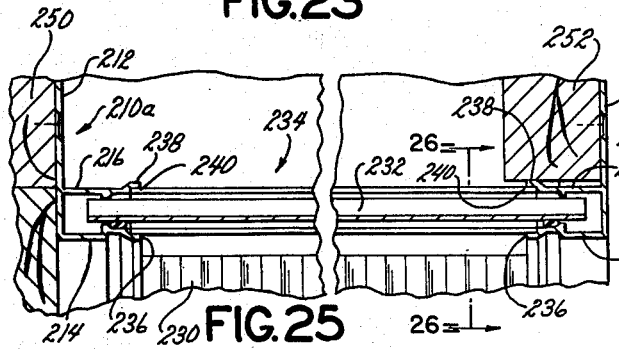

3,170,266
SOFFIT SYSTEMS
Charles L. Roberts, Louisville, Ky., and Paul W. Stoneburner, Chesterfield County, Va., assignors to Reynolds Metals Company, Richmond, Va., a corporation of Delaware
Continuation of application Ser. No. 8,035, Feb. 11, 1960. This application Nov. 7, 1962, Ser. No. 236,102
23 Claims. (Cl. 50—66)

This invention relates to a soffit system for building constructions, and is a continuation of application Serial No. 8,035 filed February 11, 1960.

Previous soffit systems are objectionable for a number of reasons. For example, soffits have been made of relatively thin boards of wood or plywood. Such soffits are subject to decay, and also are likely to become damp so the paint coating peals off. Also these previous soffit systems require a relatively large amount of labor for installation.

Attempts have been made to overcome the objections to decay and dampness by providing air venting constructions on the soffit boards. However, such air venting constructions have been relatively unattractive, relatively ineffective to provide adequate ventilation to prevent the dampness and condensation which causes the decay, have been subject to injury, and have been relatively expensive in installation costs, due to the labor requirements for such constructions.

The soffit construction of this invention, on the other hand, overcomes the above objections, and in addition provides an easily installed and light weight structure which is attractive, efficient and not subject to deterioration.

The soffit material of this invention preferably is a relatively thin metal sheet, such as of commercial aluminum, or of a suitable alloy thereof, in which the sheet is in strip form which may be easily and compactly stored, in rolls for example, and transported, and which may be readily unpacked, unrolled, and installed at the place of use. The strip, when combined with the supports of this invention, is of such a nature that it automatically becomes relatively rigid when completely installed. If desired, proper and sufficient ventilation may be provided without using relatively unsightly louvers or similarly conspicuous large openings.

Soffit supports according to this invention are also provided, which may be made from either extruded metal or sheet metal, such as of commercial aluminum, or a suitable alloy thereof. These supports, for example, may be extruded in strip form which permits their economical, efficient, and easy installation on the building structure. They receive and rigidify the soffit material after it has been installed. The extrusion process by which they are made makes them rugged and relatively low in cost. They cooperate with the soffit material to provide an economically and easily installed soffit construction.

Hence it is among the objects of this invention to provide a soffit system adaptable to various building conditions, each component of which has one or more of the foregoing features and advantages.

Further objects and advantages of this invention will become apparent as the description proceeds with reference to the accompanying drawings, in which:

FIGURE 1 is a typical vertical cross-section of one installation of this invention.

FIGURE 2 is a cross-section along the line 2—2 of FIGURE 1.

FIGURES 3 and 4 are enlarged views of portions of FIGURE 1.

FIGURE 5 is a typical vertical cross-section of another installation of this invention, with parts broken away.

FIGURES 6 and 7 are enlarged views of portions of FIGURE 5.

FIGURE 8 is a typical vertical cross-section of another installation of this invention.

FIGURE 9 is a view along the line 9—9 of FIGURE 8.

FIGURE 10 is an enlarged view of a portion of FIGURE 8.

FIGURE 11 is a typical vertical cross-section of another installation of this invention, with parts broken away.

FIGURES 12 and 13 are enlarged views of portions of FIGURE 11.

FIGURE 14 is a vertical "direct view" cross-section of a typical gable soffit construction embodying this invention, taken along the vertical plane of line 14—14 of FIGURE 15.

FIGURE 15 is a "mirror reflection" view of a typical corner soffit construction, shown in reduced scale.

FIGURE 16 is a vertical "direct view" cross-section along the vertical plane of line 16—16 of FIGURE 15.

FIGURE 17 is an enlarged view of part of FIGURE 14.

FIGURE 18 is an enlarged view of part of FIGURE 16.

FIGURE 19 is a perspective side view of a flexible sealer for use with this invention.

FIGURES 20, 21 and 22 are "direct views" similar to FIGURES 5, 6, and 7 respectively, but show another embodiment of a frieze or facia strip and are taken on the vertical plane of line 20—20 of FIGURE 23.

FIGURE 23 is a "mirror reflection" corner view similar to FIGURE 15 but showing another embodiment.

FIGURE 24 is a "direct view" along the vertical plane of line 24—24 of FIGURE 23.

FIGURE 25 is a "direct view" along the vertical plane of line 25—25 of FIGURE 23.

FIGURE 26 is a cross section along line 26—26 of FIGURE 25.

According to this invention, a building which has a wall structure with an overhanging roof structure is provided with a continuous metal facia strip construction at the edge of the overhang which has inwardly directed soffit receiving flanges. A continuous metal frieze strip construction is provided adjacent the wall structure which has outwardly directed soffit receiving flanges in aligned relationship to the facia soffit receiving flanges. A transversely corrugated sheet metal soffit strip, which may be originally packed in roll form, and which may be, for example, in the order of fifty feet more or less in length, is placed under the overhang with its edges in the space between soffit receiving flanges. The soffit strip is pulled through from one end along the said flanges for whatever length is required. The edges of the soffit are then sealed to the lower flanges by means of flexible, rattle proof, sealing strips to keep the soffit construction free from vibration noises when subjected to high winds. The soffit also may be perforated by attractive, inconspicuous, relatively small perforations in a manner to avoid the necessity of louver constructions and the like for ventilation. The entire soffit assembly may be made from aluminum containing material, such as from commercial aluminum, or suitable alloys thereof, which renders the construction decay proof. The material may be used in its natural color, or the aluminum may be treated to proper coloring by well known processes such as painting or anodizing. Thus a very light, strong, easily installed soffit construction is provided, which is adaptable for different widths of overhang and for different details of wall, roof, and rafter constructions, with the elimination of much time consuming installation procedure.

Without intending to limit the scope of the invention, the following detailed descriptions, taken in connection with the drawings of the detailed components, more fully will bring out the advantages of the invention.

For the sake of brevity certain terms, such as "vertical," "horizontal," "over," "under," are used in connection with the particular illustrations used in this disclosure. However, it is to be understood that the particular structure or item being shown and described may be in a different position, either temporarily or permanently, and still come within the purview of this invention.

Also where certain parts are substantially the same in the various embodiments, such parts may be designated with similar reference characters, with or without suffixes such as "a," "b," etc., as will become apparent.

Referring first to the installation shown in FIGURES 1–4, a building, such as a residence, office building, and the like, may have a wall, designated in general by the arrow 20, and of any suitable construction. As shown in these figures, the wall 20 may have a brick facing 21, and a frame of wood including vertical members or studs 22 with capping members 23, sheathing 24, tying members 25, and any other parts usual in such a wall. A roof structure having an inward portion supported on said wall, and having an outer overhanging portion with an outer generally vertical edge spaced from said wall may include a plurality of rafters 26 which may be supported on the wall 20, may overhang the wall 20 as indicated by the arrow 27, and may be spaced in parallel relationship, in accordance with the usual building practice, with aligned ends 28 spaced a substantial distance from the wall. The transverse end piece or pieces 29 may be secured to the ends 28 of the rafters 26 either beyond the end edges of the rafters or between the end edges, as desired.

An extruded metal facia strip 30 (or several strips end to end) may be secured directly to the ends 28 of the rafters or may be secured thereto through the medium of the transverse end piece or pieces 29, to form a continuous facia strip construction at the outer edge of the overhang. The facia strip 30 may be one example of the several extruded metal soffit receiving strips each of which has an attaching ribbon portion, such as 32, which if desired may have a nailing or other securing device zone or zones 34, through which zones nails, screws or other securing devices may pass into the building support structure. Two integral spaced soffit receiving flanges 36 and 38 may extend in a generally transverse direction from the ribbon portion 32. One of these flanges, such as the upper flange 36, may have a nailing or other securing device zone 40. The zones 34 and 40 are for the purpose of indicating and receiving nails, screws, or other securing devices which pass through or pierce the strip 30 and pass into the supporting part of the building. In this particular instance, nails or screws 42, wherever required, may pass into the piece or pieces 29, or into the ends 28 of the rafters 26, while the nails or screws 44 may pass into the bottoms 27' of the rafters 28 substantially at the ends thereof. The flange 38 of the soffit receiving strips, such as the facia strips 30, may have a seal receiving recess 46 which receives the flexible, rubber, or rubber-like sealing strip 48 between the flange 38 and the soffit strip 50 which strip 48 may be of the character shown in FIGURE 19, and which is more fully to be described. In the particular instance of FIGURES 1–4, the ribbon 32 is generally vertical, but with a slight inclination, to match the slight inclination of the ends of the rafters 26. The flanges 36 and 38 are inwardly directed toward the wall 20, and are generally transverse or perpendicular to the ribbon 32.

Another soffit receiving strip 52, FIGURES 1 and 4, is an extruded metal frieze strip having a generally vertical ribbon 54 which has two outward flanges 56 and 58 extending outwardly from the wall 20 and which receive the inner edge of the soffit 50 between them. The frieze strip 52 may be secured at the wall 20, for example, by nailing or otherwise securing the flange 58 at 59 and 60 to the bottom 27' of the rafters 26 before the brick facing 21 is completed to the height shown in FIGURE 1. The flanges 56 and 58 are generally transverse to the ribbon 54 at its upper end, but are at a slight deviation from a 90° angle to compensate for the slant of the rafters 26. The strip 52 has securing device or nailing zones at 62, 64 and 66. The zones 66 are for use in connection with wood sided walls or other types of walls as may be desired, and permit the installer to maintain a straight nailing line as he attaches the strip to the wall. The flange 56 is provided with a seal receiving recess 68 to receive the flexible sealing strip 48.

Unless otherwise described, it is to be understood that the facia and frieze strips herein disclosed are intended preferably to be attached in continuous strip form along each generally straight wall or facia. Such continuity may be maintained by a single strip or a plurality of strips placed end to end.

The soffit 50 may be transversely corrugated and has edges 70 and 72 which are received between the two flanges of the various soffit receiving strips herein disclosed. In the instance of FIGURES 1–4, the edges 70 and 72 of the soffit 50 are received by the flanges 36, 38 and 56, 58 respectively. The soffit strip 50 has transverse corrugations 74, shown for example in FIGURE 2. The soffit strip 50 may be made in varying widths to accommodate the various widths of overhangs, and may be kept in stock for standard widths of overhang. Special widths are easily made to order.

The installation shown in FIGURES 1–4 has many features which are typical of the other installations of this invention. For example, the soffit receiving strips herein disclosed may be made of any desired extruded metal, such as of aluminum containing material, in the nature of commercial aluminum, or suitable aluminum alloys. The soffit strip 50 may be made of sheets of commercial aluminum or suitable alloys thereof. For example, and not by way of limitation, the main parts of the soffit receiving strips, such as 30, 52, etc., may have a thickness of .062 inch. The ribbons may be of a width and of other dimensions suitable to accommodate the particular building construction. For example, the ribbons may be from 3.625 to 4.375 inches in width in the case of the generally vertically disposed ribbons. The longer flanges of the generally horizontal type may be of such width in a direction transverse to the ribbons so as to accommodate the desired fastening device, and for example, from 1.750 to 2.50 inches in width in a direction transverse to the ribbons. The shorter flanges may be approximately one-half the width of the longer ones. The soffit strip 50 may be of various widths such as three feet or any other width required for the particular overhang to be treated. The soffit sheet may be, for example, but not by way of limitation, .019 inch in thickness with the corrugations being ¼ inch in depth from hill to valley and 1¼ inches from hill to hill, or valley to valley. The soffit material may be what is commercially known as colorweld aluminum, natural finish aluminum or painted aluminum.

In the illustrations, the rafter material and similar materials, such as studs 22, is based on 2 x 4 inch lumber material, but any other dimension or material may be used, as is well known.

The roof cover, and guttering when used, may be of any desired construction and material. For example, the material may be aluminum or aluminum alloy in sheet form. An eave starter 78 may be nailed to the roof edge at 80 and/or 81. The roof may include roof boarding 82 in the form of plywood or the like in large sheets, such as 4 x 8 feet or larger. The aluminum sheet shingles 84 may have lower downwardly directed hook shaped flanges 86 and upper upwardly directed hook shaped flanges 88, which hook each other. In the lowest shingle row, the lowermost lower flange 86 hooks around the starter 78. The shingles 84 hook each other at their side edges, as shown at 90 in FIGURES 14 and 16 which figures are to be more fully described. The shingles are nailed to the plywood or the like near their upper edges, as is readily understood. Other types of roof covering material may be used instead.

In the installation shown in FIGURES 5–7, certain parts are, or may be, substantially identical with corresponding parts in FIGURES 1–4, and are numbered with identical reference numerals, and the previous descriptions are applicable thereto. Where the parts are deemed to be sufficiently different, but still analogous, such parts are numbered with identical numerals with the suffix $a$ added thereto, and all previous descriptions are applicable thereto as far as possible. Where the parts are quite different, new reference numerals may be used, all with the purpose of avoiding needless repetition in the descriptions thereof.

For example, the shingles 84, and the roof boarding 82 may be substantially identical in both installations. The rafters 26a in FIGURES 5–7 may have their ends 28a substantially vertical instead of at a substantially right angle to the longitudinal axis of the rafters. The building wall 20a may be slightly different in that the facing 21a may be made of vertical or horizontal boards of any desired material which may be nailed to the sheathing 24 wherever desired. The vertical members or studs 22 and capping members 23 may be the same. Aluminum flashing or surfacing may be placed over the upper edges and sides of the board facing 21a.

The soffit receiving frieze strip 52 may be identical to that used in FIGURES 1–4, but it is secured by nails or the like at 59 and 60 to the rafters 26a and at 96 to the siding 21a, which nails may extend into the sheathing 24 if desired.

The soffit strip 50 with edges 70 and 72, corrugations 74, and with or without perforations 76 may be the same as in FIGURES 1–4.

The facia strip 98, FIGURE 6, may have a ribbon attaching portion 32 with securing device zones 34 as previously described, but the flanges 36a and 38a may be deviated sufficiently from a right angled relationship with respect to ribbon 32 to compensate for the corresponding deviation in the ends 28a in the rafters 26a. The nails 42 and 44 may fasten the facia strip 98 to the ends 28a and bottoms 27'a of the rafters 26a. The seal receiving recess 46 and the seal strip 48 may be substantially the same as previously described.

A gutter 100 may be provided. This may be of aluminum containing sheet material of the character previously described and having sides 102 and 104, and bottom 106. The side 104 extends upwardly and forms the eave starter 108, similar in function to starter 78 of FIGURES 1–4. The gutter may be supported by brackets 110 periodically spaced along the edge of the roof and secured thereto outside the facia strip 98, by suitable securing devices, such as nails, screws, etc. The top edge of the gutter may be nailed to the edge of the roof at 80a and/or 81a, as desired.

Parts which are numbered the same as in FIGURES 1–4, with or without the suffix $a$ are substantially the same as previously described, and their description is not repeated.

In the installation shown in FIGURES 8, 9 and 10, a large number of parts are substantially the same as in FIGURES 1–4, are marked with identical reference numerals, and are not again described. The construction is of the character that provides a substantially horizontal soffit, and the parts which provide this construction are now described.

The rafters 26b have vertical ends 28b, and the facia strip 30 may be substantially identical with the facia strip 30 of FIGURES 1–4, but in this case the ribbon portion 32 is secured in vertical position with the flanges 36 and 38 in horizontal position to receive the edge 70 of the soffit strip 50 in a horizontal position.

A plurality of horizontal members, or outlookers, 112 may be nailed or otherwise secured at their outer ends to the adjacent ends 28b of the rafters 26b. The inner ends of outlookers 112 are nailed or otherwise secured to a horizontal nailing strip 114, which is nailed to the sheathing 24b of the wall 20b. The wall 20b may include the brick facing 21b, studs 22b, capping members 23b, sheathing 24b, and tying members 25b which are somewhat the same as corresponding members in FIGURES 1–4, but which are slightly modified, as is obvious from the drawings, to accommodate the horizontal soffit strip 50.

A frieze strip 116, FIGURES 8 and 10, may be made of extruded metal, as may be all of the frieze, facia, and splicing strips herein disclosed, and such metal may be aluminum containing material such as commercial aluminum, or a suitable alloy thereof. The frieze strip 116 may have a substantially vertical ribbon member 118, with upper flange 120, and lower flange 122, both being substantially horizontal in this instance to receive the edge 72 of the soffit 50 between them. The flange 122 may have the seal receiving recess 68b to receive the sealing strip 48, such as shown in FIGURE 19, under the facia strip 50 and above the flange 122. The upper flange 120 may have the securing device receiving zones 62b and 64b to receive the nails, screws, or other securing devices 59b and 60b, respectively, for attaching the frieze strip 116 to the bottoms 124 of the outlookers 112. The frieze ribbon 118 may be provided with securing device zones 126 for use in connection with board wall facing when desired, but which are not used with the brick facing 21b of this installation. The ribbon 118 extends down to overlap the brick facing 21b; but the frieze strip 116 is secured to the outlookers 112 before the facing 21b has been built behind the frieze strip 116 to the final height shown.

The facie strip 30, in FIGURE 8, may be secured by nails or the like 42 to the ends of the rafters 26b and/or to the ends of the outlookers 112. The flange 36 may be secured to the bottoms 124 of the outlookers 112 by nails or the like 44.

The eave starter 78b may be substantially the same as starter 78 of FIGURES 1–4, but is modified slightly to accommodate the slightly different roof slant. The starter 78b may be secured to the edge of the roof at 80b and/or 81b, as desired.

In the installation shown in FIGURES 11, 12 and 13, the soffit strip 50 is in horizontal position, somewhat similar to the embodiment of FIGURES 8–10, but the outlookers 112 are omitted, and the wall siding 21c is of vertical or horizontal board material, as will become evident.

The rafters 26c have vertical edges 28c in vertical position, and the wall 20c may include studs 22c, caps 23c, sheathing 24c, and aluminum sheet flashing 94c. The facia strips 128 may include the ribbon 32 with securing device zones 34 as previously described to be attached to the ends 28c of the rafters 26c. The upper flange 36c has a portion 130 perpendicular to the ribbon 32 and a slanting portion 132 to be parallel to and be attached to the bottoms 27'c of the rafters 26c by the nails 44c or similar securing devices which may pass through the zone 40c. The lower flange 38 may be perpendicular to the ribbon 32 and may have the seal receiving recess 46 to receive the seal 48, as previously described in connection with the other installations. The edge 70 of the soffit strip 50 is received between the flange 38 and the portion 130 of the flange 36c.

The frieze strip may have a vertical ribbon 136 with zones 138 for securing devices such as nails 140 which may be driven into the siding 21c. The upper and lower flanges 142 and 144 are secured to and are integral with the ribbon 136 and receive the edge 72 of the soffit strip 50 between them. The lower flange 144 has the seal receiving recess 146 for receiving the seal 48 between the soffit 50 and the lower flange 144.

The roof boarding 82 and shingles 84 may be the same as previously described. The gutter 100, gutter brackets 110, eave starter 108 may be as previously described.

The installation shown in FIGURES 14–18 may be used at the gable end of a building which uses any of the other installations of this invention along the sides of the building.

In FIGURE 14, the studs 22d, caps 23d, sheathing 24d, siding 21d and flashing 94d may be at a gable end of the building, but may otherwise be generally similar to corresponding parts heretofore described. The rafter 26 may be the last rafter of previously described installations which is supported by the side wall of the building. A special timber piece 146 extends along the gable under and substantially in contact with the bottom of the rafter 26. Spacer blocks 148 extend between the piece 146 and the cap 23d. The siding 21d or similar siding, is continued upwardly along the gable, preferably in horizontal boarding, to a close proximity to the piece 146. The frieze strip or rake support 150 is secured to the piece 146 by the nails or similar securing devices 152 which pass through a securing zone 154. The lower end 156 of the ribbon 158 always extends a substantial distance below the upper edge of the siding which is placed in the gable end of the building.

A pair of floating rafters 160 are secured to the edge of the roof boarding 82, and are parallel to the rafters 26, 26a, etc. Facia strips 30, similar to those shown in FIGURE 3, are secured to the pair of rafters 160, as by nails or similar securing devices 42 and 44.

The frieze strip 150 has upper and lower flanges 162 and 164. The facia strip 30 has upper and lower flanges 36 and 38. These flanges are similar to those previously described and receive the edges 70e of a soffit strip 50e all of which may be substantially the same in general construction, as previously described, but of narrower width, if desired.

An aluminum sheet gable starter 166 may be nailed at 168 and/or 170 to the rafter 160 and roof board 82. The starter has upper and lower flanges which hold the side edges 172 of the shingles 84.

The lower flanges 164 and 38 receive sealing strips 48 in sealing strip receiving recesses 68e and 46 in a manner similar to that previously described.

The soffit construction at the corner of the building of the gable type is shown in FIGURES 15, 16 and 18.

Members 26, 30, 50e, 82, 84, 160, and 166 may be the same as in FIGURE 14, and may be continuations thereof. A splice section, or frieze like section 174 may be an extruded metal soffit receiving strip, made of commercial aluminum or of a suitable alloy thereof, and may be secured to the rafter 26 at the overhang by securing devices such as nails 178. The frieze-like section 174 has a substantially vertical ribbon 180 to which are integrally attached the twin pair of upper flanges 182 and lower flanges 184. The upper flanges 182 have zones 186 for securing devices, such as nails 178, while the lower flanges 184 have seal receiving recesses 68e. The right hand flanges 182 and 184 of FIGURE 18 receive the edge 72e of the soffit 50e. The left hand flanges 182 and 184 of FIGURE 18 receive the end 187 of a soffit strip 50, such as the end of the soffit strip 50 disclosed in FIGURES 1 to 4 or 5 to 7. A special seal, such as a flexible tube 188, of rubber or the like, may be placed in the left hand seal receiving recess 68e.

The strip 174 may be fitted snugly at its ends into the flanges of facia strip 30 or 98 and frieze strip 52 of FIGURES 1–4 or 5–7, for example and these ends may be fastened, for example, with #8 x 5/16 S.M. screws.

The sealing strip 48 shown in FIGURE 19 may be used with this invention. It may be made of rubber or rubber-like material. It has a straight edge 190 to cooperate with the flat surface of the flanges and the like. It has the sinuous edge 192 to cooperate with the corrugations of the soffit strip. The strip 48 may be of any desired width to fit into the seal receiving recesses 46, etc. If desired, a flexible tube, such as tube 188, shown in FIGURE 18 of rubber or the like, and of desired size and flexibility, may be used instead of and wherever strip 48 has been indicated.

The soffit strip 50 may have ventilating perforations 76 along its surface. Preferably these perforations are small enough to prevent entrance of the larger bugs and insects and yet are large enough and frequent enough to provide satisfactory ventilation. For example, these perforations 76 may be in the order of from 1/16 to 1/8 inches in diameter and may be placed in the order of from 1/4 to 3/8 inches apart in rows in the order of from 1/4 to 3/8 inches apart with the perforations 76 aligned or staggered with respect to adjacent rows. These measurements are applicable to the soffit strip before it is corrugated.

FIGURES 20, 21 and 22 show an extruded soffit supporting strip which may be selectively a facia or a frieze strip 210 and which may be used as a substitute for the soffit receiving frieze strip 52 and the soffit receiving facia strip 98 of FIGURES 5–7. The other members of FIGURES 5–7 may be the same as previously described and hence their description is not repeated.

In addition, the facia or frieze strip 210 may be substituted practically for all of the facia and/or frieze strips shown in any of the FIGURES 1–19, as will become apparent.

The soffit supporting strip 210 may be used either as a facia strip or a frieze strip by cutting the attaching ribbon portion 212 to the desired width or by extruding the strip with a ribbon 212 of the desired width. If desired, the ribbon 212 may be particularly designed for a facia strip or for a frieze strip, as is obvious.

The strip 210 may have flanges 214 and 216 which are sufficiently separated to permit the soffit 230 to be received at varying angles to said ribbon 212 so that said soffit may be at right angles to the ribbon 212 or at some other angle to ribbon 212. For example, the soffit may slant and follow the inclination of the rafters 26a, or the soffit 218 may be level, as indicated in dotted lines at 218 for use in installations such as shown in FIGURES 8 and 11.

To provide this adaptability for the reception of the soffit at varying angles to the ribbon 212, the flanges 214 and 216 are provided with fulcrum-like means or inward ridges 220 and 222 which provide a certain amount of leeway for such soffit reception. Suitable flexible sealing means 224 may be placed between the flange 214 or 216 and the soffit. Such sealing means may be of the types shown in FIGURES 18 and 19, if desired.

The strip 210 is also adapted to receive the ends of a splice strip 234 which is similar to strip 174 of FIGURES 15, 16, and 18, but in a manner typically shown in FIGURES 23–26.

FIGURE 23 is a "mirror reflective" image of the overhang at a corner of a gable end building wherein 230 indicates the slanting soffit under the eaves or rafter ends, as shown in full lines in FIGURES 20–22. The gable end overhang soffit is indicated at 232. A strip 234 at the corner of the building receives an edge of soffit 230 and an end of soffit 232 as shown in FIGURES 24–26.

The oppositely directed flanges 214 and 216 of soffit supporting strips 210a and 210b, FIGURE 25, are provided with notched lips 236 and 238 respectively, which receive the ends 240 of the splice strip 234. The left hand flanges 242 and 246', FIGURE 26, of strip 234, receive the edge of eave soffit 230, while the right hand flanges 246 and 248 of strip 234 receive the end of the gable soffit 232.

The last wall supported rafter 250, FIGURE 25, at the gable end receives the ribbon 212 of the frieze strip 210a.

The overhung rafter 252 receives the ribbon 212 of the facia strip 210b.

The flange constructions 214 and 216 of the soffit supporting strip 210 therefore are adapted to receive the edge of the soffit in a horizontal or slanting position under the eaves because of the ridge constructions 220 and 222. These flanges 214 and 216 are also adapted to receive the ends 240 of the splice strip 234 in the notched lips 236 and 238. This provides practically a universal soffit supporting strip adaptable for use under a large number of conditions.

Hence the soffit receiving strip 210 may be used as a facia strip as shown at the left end of FIGURES 20 and 21 to receive the soffit 230 at a slant with respect to the attaching ribbon 212, as shown in full lines in FIGURES 20 and 21, or to receive the soffit 218 at right angles, as shown in dotted lines in these figures.

Also the soffit receiving strip 210 may be used as a frieze strip which receives the soffit 230 at a slant, as shown in full lines in FIGURE 22 or at the right side of FIGURE 20. The strip 210 may be a frieze strip and also receive the soffit 218 at right angles to the attaching ribbon 212, as shown in dotted lines in FIGURE 22.

Also the strip 210 may receive the end of an additional splice strip 234 in the notched lips 236 and 238 as shown in FIGURES 23-26, so the splice strip 234 may receive and splice the edge of a soffit, such as eave soffit 230 and the end of another soffit 232 which is at an angle to the first soffit 230 to provide an easily assembled construction at the corner of the building.

From the foregoing disclosure it is to be seen that a soffit system or construction is provided which can be applied to a large number of types of buildings, and still retain the features, advantages and objects of the invention heretofore described.

While the form of the invention now preferred has been disclosed as required by the statutes, other forms may be used, all coming within the scope of the claims which follow.

What is claimed is:

1. In combination, a vertical wall, a roof structure supported on said wall and having an outer overhanging portion provided with an end spaced from said wall, a facia strip means secured at said end and having an inward flange extending inwardly from said end toward said wall, a frieze strip means supported at said wall and having an outward flange extending outwardly from said wall, and a soffit strip placed longitudinally along said overhanging portion with its edges respectively resting on said flanges, said facia and frieze strip means being arranged to receive one end of said soffit strip on one end of said flanges and to permit said soffit strip to be longitudinally moved relative thereto to be telescoped under said overhanging portion and on said flanges.

2. A combination as set forth in claim 1 wherein resilient sealing means are disposed between said flanges and said soffit strip.

3. A combination as set forth in claim 2 wherein said flanges each has an intermediate upstanding abutment to limit the degree of insertion of said resilient means.

4. In combination, a vertical wall, a roof structure supported on said wall and having an outer overhanging portion provided with an end spaced from said wall, a facia strip means secured at said end and having upper and lower inward vertically spaced flanges extending inwardly from said end toward said wall and longitudinally along said strip means, a frieze strip means supported at said wall and having an outward flange extending outwardly from said wall, and a soffit strip placed longitudinally along said overhanging portion with its edges respectively resting on said lower inward flange and said outward flange, said facia and frieze strip means being arranged to receive one end of said soffit strip on one end of said lower inward flange and said outward flange and to permit said soffit strip to be longitudinally moved relative thereto to be telescoped under said overhanging portion and between said upper and lower inward flanges.

5. A combination as set forth in claim 4 wherein resilient sealing means are disposed between said soffit strip and said lower inward flange and said outward flange, said resilient means compacting said soffit strip against said upper inward flange.

6. A combination as set forth in claim 5 wherein said lower inward flange and said outward flange each has an intermediate upstanding abutment to limit the degree of insertion of said resilient means.

7. In combination, a vertical wall, a roof structure supported on said wall and having an outer overhanging portion provided with an end spaced from said wall, a facia strip means secured at said end and having an inward flange extending inwardly from said end toward said wall, a frieze strip means supported at said wall and having upper and lower outward vertically spaced flanges extending outwardly from said wall and longitudinally along said strip means, and a soffit strip placed longitudinally along said overhanging portion with its edges respectively resting on said inward flange and said lower outward flange, said facia and frieze strip means being arranged to receive one end of said soffit strip on one end of said inward flange and said lower outward flange and to permit said soffit strip to be longitudinally moved relative thereto to be telescoped under said overhanging portion and between said upper and lower outward flanges.

8. A combination as set forth in claim 7 wherein resilient sealing means are disposed between said soffit strip and said inward flange and said lower outward flange, said resilient means compacting said soffit strip against said upper outward flange.

9. A combination as set forth in claim 8 wherein said inward flange and said lower outward flange each has an intermediate upstanding abutment to limit the degree of insertion of said resilient means.

10. In combination, a vertical wall, a roof structure supported on said wall and having an outer overhanging portion provided with an end spaced from said wall, a facia strip means secured at said end and having upper and lower inward vertically spaced flanges extending inwardly from said end toward said wall and longitudinally along said strip means, a frieze strip means supported at said wall and having upper and lower outward vertically spaced flanges extending outwardly from said wall and longitudinally along said strip means, and a soffit strip placed longitudinally along said overhanging portion with its edges respectively resting on said lower flanges, said facia and frieze strip means being arranged to receive one end of said soffit strip on one end of said lower flanges and to permit said soffit strip to be longitudinally moved relative thereto to be telescoped under said overhanging portion and between said upper and lower flanges.

11. A combination as set forth in claim 10 wherein resilient sealing means are disposed between said lower flanges and said soffit strip and compact said soffit strip against said upper flanges.

12. A combination as set forth in claim 11 wherein said lower flanges each has an intermediate abutment to limit the degree of insertion of said resilient means.

13. In combination, a vertical wall, a roof structure supported on said wall and having an outer overhanging portion provided with an end spaced from said wall, an extruded metal facia strip means secured to said end and including a generally vertical ribbon disposed against said end and having integral upper and lower inward vertically spaced flanges extending inwardly from said end toward said wall and extending longitudinally throughout the length of said ribbon, and extruded metal frieze strip means supported at said wall and including a generally vertical ribbon disposed against said wall and having integral upper and lower outward vertically spaced flanges extending outwardly from said wall and extending longitudinally throughout the length of said ribbon, and a transversely corrugated sheet metal soffit strip having its edges extending into the spaces between said upper and lower flanges to form a soffit under said overhanging portion, said facia and frieze strip means being arranged to receive one end of said soffit strip on one end of said lower flanges and to permit said soffit strip to be longitudinally moved relative thereto to be telescoped under said overhanging portion and between said upper and lower flanges.

14. A combination as set forth in claim 13 wherein resilient sealing means are disposed between said soffit strip and said lower flanges to fill all voids therebetween and compact said soffit strip again under said upper flanges.

15. A combination as set forth in claim 14 wherein said lower flanges each has an intermediate upstanding abutment to limit the degree of insertion of said resilient means.

16. A method for making a soffit assembly comprising the steps of securing a facia strip at the generally vertical outer edge of a portion of a roof structure overhanging a generally vertical wall, said facia strip having upper and lower inward vertically spaced flanges extending inwardly from said vertical edge toward said wall, securing a frieze strip at said wall, said frieze strip having upper and lower outward vertically spaced flanges extending outwardly from said wall, placing one end of a soffit strip on one end of said lower flanges, thereafter longitudinally telescoping said soffit strip between said upper and lower flanges to form a soffit under said overhanging portion throughout substantially the entire length of said overhanging portion, and thereafter inserting resilient sealing means between said soffit strip and said lower flanges to compact said soffit strip against said upper flanges.

17. In combination: a vertical wall; a roof structure having an inward portion supported on said wall and an outer overhanging portion having an outer generally vertical edge spaced from said wall a substantial distance; a facia strip secured at said vertical edge and having an inward flange extending inwardly from said vertical edge towards said wall; a frieze strip being secured to said outer overhanging portion of said wall and having an outward flange extending outwardly from said wall; and a soffit strip placed longitudinally along said overhanging portion with its edges resting respectively on said inward flange and said outward flange to form a soffit under said overhanging portion.

18. In combination: a vertical wall; a roof structure having an inward portion supported on said wall and an outer overhanging portion having an outer generally vertical edge spaced from said wall a substantial distance; a facia strip secured at said vertical edge and having upper and lower inward vertically spaced flanges extending inwardly from said vertical edge toward said wall; a frieze strip being secured to said outer overhanging portion at said wall and having an outward flange extending outwardly from said wall; and a soffit strip placed longitudinally along said overhanging portion with its edges resting respectively between said inward flanges and on said outward flange to form a soffit under said overhanging portion.

19. In combination: a vertical wall; a roof structure having an inward portion supported on said wall and an outer overhanging portion having an outer generally vertical edge spaced from said wall a substantial distance; a facia strip secured at said vertical edge and having an inward flange extending inwardly from said vertical edge toward said wall; a frieze strip being secured to said outer overhanging portion at said wall and having upper and lower outward vertically spaced flanges extending outwardly from said wall; and a soffit strip placed longitudinally along said overhanging portion with its edges resting respectively on said inward flange and said lower outward vertically spaced flange to form a soffit under said overhanging portion.

20. In combination: a vertical wall; a roof structure having an inward portion supported on said wall and an outer overhanging portion having an outer generally vertical edge spaced from said wall a substantial distance; a facia strip secured at said vertical edge and having upper and lower inward vertically spaced flanges extending inwardly from said vertical edge toward said wall; a frieze strip being secured to said outer overhanging portion at said wall and having upper and lower outward vertically spaced flanges extending outwardly from said walls; and a soffit strip placed longitudinally along said overhanging portion with its edges resting respectively on said lower inward flange and said lower outward flange to form a soffit under said overhanging portion.

21. In combination; a vertical wall; a roof structure having an inward portion supported on said wall and an outer overhanging portion having an outer generally vertical edge spaced from said wall a substantial distance; an extruded metal facia strip secured to said roof structure edge and comprising a generally vertical attaching ribbon having upper and lower soffit receiving flanges generally spaced from each other a distance to receive the edge of a soffit strip, extending inwardly from said vertical edge, and integrally secured to said ribbon; an extruded metal frieze strip secured to said outer overhanging portion at said wall and comprising a generally vertical attaching ribbon having upper and lower soffit receiving flanges generally vertically spaced from each other a distance to receive the edge of the soffit strip and integrally secured to said ribbon; and a transversely corrugated sheet metal soffit strip extending between said facia strip and said frieze strip and having its edges extending into the spaces between said upper and lower flanges of said facia strip and said frieze strip.

22. In combination: a first and second vertical walls substantially at right angles to each other and meeting at a corner; a roof structure having inward portions supported on said walls and having respectively first and second outer overhanging portions substantially at right angles to each other and having outer generally vertical edges spaced from said walls a substantial distance, first and second facia strips respectively secured to said outer vertical edges of said first and second overhanging portions and respectively having inward flanges extending inwardly toward said first and second walls, first and second frieze strips respectively secured to said first and second walls and respectively having flanges extending outwardly from said walls, a soffit member having opposed ends respectively received on said flanges of said first facia and frieze strips, said soffit member having opposed flanges extending outwardly from each side thereof, a first soffit strip having opposed edges thereof respectively disposed on said flanges of said first facia and frieze strips and having an end thereof disposed on one of the flanges of said soffit member, and a second soffit strip having opposed edges thereof respectively disposed on said flanges of said second facia and frieze strips with part of one edge thereof disposed on the other flange of said soffit member and having an end thereof disposed on the flange of said first facia strip.

23. A method for making a soffit assembly for a building structure having first and second vertical walls disposed substantially at right angles to each other and meeting at a corner of said building structure and having a roof structure provided with inward portions supported on said walls and respectively having first and second outer overhanging portions substantially at right angles to each other and provided with outer generally vertical edges spaced from said walls a substantial distance, and comprising the steps of securing first and second facia strips respectively along said outer vertical edges of said first and second overhanging portions, said first and second facia strips having inward flanges extending inwardly from said vertical edges toward said first and second walls, securing first and second frieze strips to said first and second walls, said first and second frieze strips having outward flanges extending outwardly from said first and second walls, respectively disposing the ends of a soffit receiving member on the flanges of said first facia strip and said first frieze strip, said soffit member having opposed flanges extending outwardly from each side thereof, longitudinally telescoping a first soffit strip between said flanges of said first facia and frieze strips and said first overhanging portion of said roof structure until an end of said first soffit strip is received on one of said flanges of said soffit member, and longitudinally telescoping a second soffit strip between said flanges of said second facia and frieze strips and said second overhanging portion of said roof structure until an edge of said second soffit strip is received on the other flange of said soffit member and an end of said second soffit strip is received on said flange of said first facia strip.

References Cited by the Examiner

UNITED STATES PATENTS

| | | | |
|---|---|---|---|
| 2,538,240 | 1/51 | Fry | 50—46 |
| 2,896,559 | 7/59 | Stephens | 50—66 |
| 2,953,872 | 9/60 | Baker | 50—66 |
| 2,970,676 | 2/61 | Maciunas | 189—1 |

FOREIGN PATENTS

| | | |
|---|---|---|
| 737,653 | 9/55 | Great Britain. |
| 209,055 | 6/57 | Australia. |

OTHER REFERENCES

Aluminum Extrusions, published by Reynolds Metals Co., 1952, page 4, Figure 3.

Alcoa Aluminum Bldg. Prod. pamphlet, pub. 1957, page 26, A1A file 12c.

House & Home publication, December 1958, page 108.

EARL J. WITMER, *Primary Examiner.*

JACOB I. SHAPIRO, *Examiner.*